(12) United States Patent
Ning

(10) Patent No.: US 9,873,447 B2
(45) Date of Patent: Jan. 23, 2018

(54) VEHICLE, A HYBRID POWER SYSTEM THEREOF AND A CONTROL METHOD THEREFOR

(71) Applicants: BEIQI FOTON MOTOR CO., LTD., Beijing (CN); BEIJING ZHI KE INVESTMENT AND MANAGEMENT CO., LTD, Beijing (CN)

(72) Inventor: Jiafei Ning, Beijing (CN)

(73) Assignees: BEIQI FOTON MOTOR CO., LTD., Beijing (CN); BEIJING ZHI KE INVESTMENT AND MANAGEMENT CO., LTD., Beijing (CN)

( * ) Notice: Subject to any disclaimer, the term of this patent is extended or adjusted under 35 U.S.C. 154(b) by 40 days.

(21) Appl. No.: 15/101,769

(22) PCT Filed: Oct. 23, 2014

(86) PCT No.: PCT/CN2014/089304
§ 371 (c)(1),
(2) Date: Jun. 3, 2016

(87) PCT Pub. No.: WO2015/081767
PCT Pub. Date: Jun. 11, 2015

(65) Prior Publication Data
US 2016/0304115 A1    Oct. 20, 2016

(30) Foreign Application Priority Data

Dec. 4, 2013  (CN) .......................... 2013 1 0646722

(51) Int. Cl.
*B62D 1/19* (2006.01)
*B62D 1/16* (2006.01)
(Continued)

(52) U.S. Cl.
CPC .............. *B62D 1/197* (2013.01); *B60R 21/09* (2013.01); *B62D 1/16* (2013.01); *B62D 1/20* (2013.01)

(58) Field of Classification Search
CPC .. B62D 1/16; B62D 1/20; B62D 1/197; B60R 21/09; B60R 21/205; B60W 10/20; B60W 10/30; G05B 19/042; G05B 2219/2637
(Continued)

(56) References Cited

U.S. PATENT DOCUMENTS 5,692,770 A * 12/1997 Scharboneau ........ B60R 21/203
                                                                280/728.2
6,371,507 B1 * 4/2002 Durrani ................. B60R 21/203
                                                                280/728.2
(Continued)

FOREIGN PATENT DOCUMENTS

CN    101519083 A    9/2009
CN    102233897 A    11/2011
(Continued)

*Primary Examiner* — Nga X Nguyen
(74) *Attorney, Agent, or Firm* — Maschoff Brennan

(57) ABSTRACT

A detachable steering mechanism, comprising a steering wheel (1), an upper steering column (2), a worm (10), and a drive system and control system (20); said steering wheel (1) being fixedly connected to said upper steering column (2); said upper steering column (2) being provided with a thread (11), and a first drive gear (3) being provided on said worm (10); the thread (11) of the upper steering column (2) meshing and rotating with said first drive gear (3); upon said control system (20) detecting the ejection of the steering wheel airbag, controlling said drive system to drive said worm (10), said first drive gear (3) is driven to move away from the thread (11) of the upper steering column (2), allowing said upper steering column (2) to move along its own axis. When the steering wheel airbag deploys, said (Continued)

detachable steering mechanism allows the steering wheel (1) to move in the axial direction, thereby increasing the buffer travel in a collision between the driver's head and the steering wheel airbag, reducing the impact of the airbag on the driver's head and improving safety performance of the vehicle.

10 Claims, 4 Drawing Sheets

(51) Int. Cl.
      *B62D 1/20*         (2006.01)
      *B60R 21/09*       (2006.01)

(58) Field of Classification Search
      USPC .................................................. 280/775–777
      See application file for complete search history.

(56) References Cited

U.S. PATENT DOCUMENTS

| | | | |
|---|---|---|---|
| 7,604,255 | B2 | 10/2009 | Carwright |
| 2008/0217890 | A1* | 9/2008 | Fukawatase ........ B60R 21/2032 |
| | | | 280/731 |

FOREIGN PATENT DOCUMENTS

| | | |
|---|---|---|
| CN | 102951194 A | 3/2013 |
| GB | 2340086 A | 2/2000 |

\* cited by examiner

VEHICLE, A HYBRID POWER SYSTEM THEREOF AND A CONTROL METHOD THEREFOR

TECHNICAL HELD

The present invention relates to the technical fled of automobile airbag systems, especially relates to a detachable steering mechanism.

BACKGROUND OF THE INVENTION

In the prior art, the automobile has airbag to improve the safety performance of the vehicle. The airbag for the position of the driver is installed in the steering mechanism. When the automobile is subjected to a serious front collision or a quasi front collision (equal to a frontal collision on a rigid wall at a speed of faster than I6 km/h), the collision-detection and ignition device in the automobile will transfer a sudden-deceleration signal to the detonation device of the gas generator, so as to generate nitrogen with related substances, and the airbag in front of the driver is inflated. Helium will fill the airbag in a period of less than 0.05 s, and the main matter for generating gas is sodium azide NaN3. According to the calculation, after explosion, 100 g of NaN3 can generate about 50 L of nitrogen, which fully filled in the airbag. The airbag, at one side thereof, is provided with exhaust holes, when the driver contacts and presses the inflated airbag, the nitrogen in the airbag is discharged through the exhaust holes, and the hot nitrogen will be cooled quickly after being discharged. In this way, the energy of the forward movement of the driver is absorbed. However, when the collision occurs, the airbag will deploy or be ejected at a very fast speed, and the steering wheel is fixed, so that the driver's head contacts with the airbag in a relatively short travel. Due to the short buffer process, the airbag will impact on the driver's head severely in a short buffer travel, and it is easy for the head of the driver to be injured.

In order to solve the above problems, the invention makes some improvements.

SUMMARY OF THE INVENTION

(a) The Technical Problems to be Solved

The purpose of the invention is to provide a detachable steering mechanism, so that the steering wheel can move axially in case that built-in airbag deploys or is ejected in a collision accident, in order to increase the cushion stroke of the driver's head with the airbag crash, and to reduce the impact of the airbag on the driver's head.

(b) The Technical Solution

The purpose is achieved by: a detachable steering mechanism, comprising a steering wheel, an upper steering column, a worm, a drive system and a control system; the worm includes a first end provided with a first bearing seat, and a second end provided with a second bearing seat; the steering wheel is fixedly connected to the upper steering column; the upper steering column is provided with a thread, and the worm is provided with a first drive gear, the thread of the upper steering column engages with the first drive gear; if the control system detects the deploying of the steering wheel airbag, it controls the drive system to drive the worm, so that the first drive gear disengages from the thread of the upper steering column, in order to allow the upper steering column to move along its own axis.

The control system comprises a sensor and a controller, the controller is connected with the sensor and the drive system, respectively.

Furthermore, the sensor is a trigger-type sensor.

Specifically, the drive system comprises a block driving mechanism and an elastic member in a pre-loaded state; the elastic member is arranged on the first bearing seat; the first bearing seat is provided with a block, to block the first bearing seat from moving due to thrust action by the elastic member; when the steering wheel airbag is ejected, the block driving mechanism drives the block to move away from the first bearing seat, and the elastic member forces the first bearing seat to drive the worm.

Preferably, the elastic member comprises springs.

The springs are vertically arranged on the side of the first bearing seat, near the upper steering column, and the springs are in a compression state.

The springs are evenly distributed on the first bearing seat,

Furthermore, the second bearing seat is provided with a pin; under the thrust force of the elastic member, the worm drives the second bearing seat to rotate around the pin.

The pin is arranged in the second bearing seat, in parallel to the direction of the upper steering column.

The block driving mechanism is powered electrically or pneumatically.

(c) The Advantages

Compared with the prior art and the existing product, the invention has the following advantages:

1. With the detachable steering mechanism of the invention, the steering wheel can be moved in the axial direction when the steering wheel airbag is ejected or deploys, so as to increase the buffer travel in a collision between the driver's head and the steering wheel airbag, and to reduce the impact of the airbag on the driver's head, and to improve the safety performance of the vehicle.

2. The detachable steering mechanism has a simple structure, and can disengage the steering mechanism automatically, so as to ensure the stability and accuracy of the control for the separation of the steering mechanism, and to improve the safety performance of the steering mechanism.

1—steering wheel, 2—upper steering column, 3—first drive gear, 4—first bearing seat, 5—spring, 6—lower steering column, 7—second drive gear, 8—second bearing seat, 9—pin, 10—worm, 11—thread, 12—block, 20—control system.

DETAILED DESCRIPTION OF THE PREFERRED EMBODIMENT

Herebelow is a detailed description of the embodiments of the invention in connection with the drawings.

Figure 1:
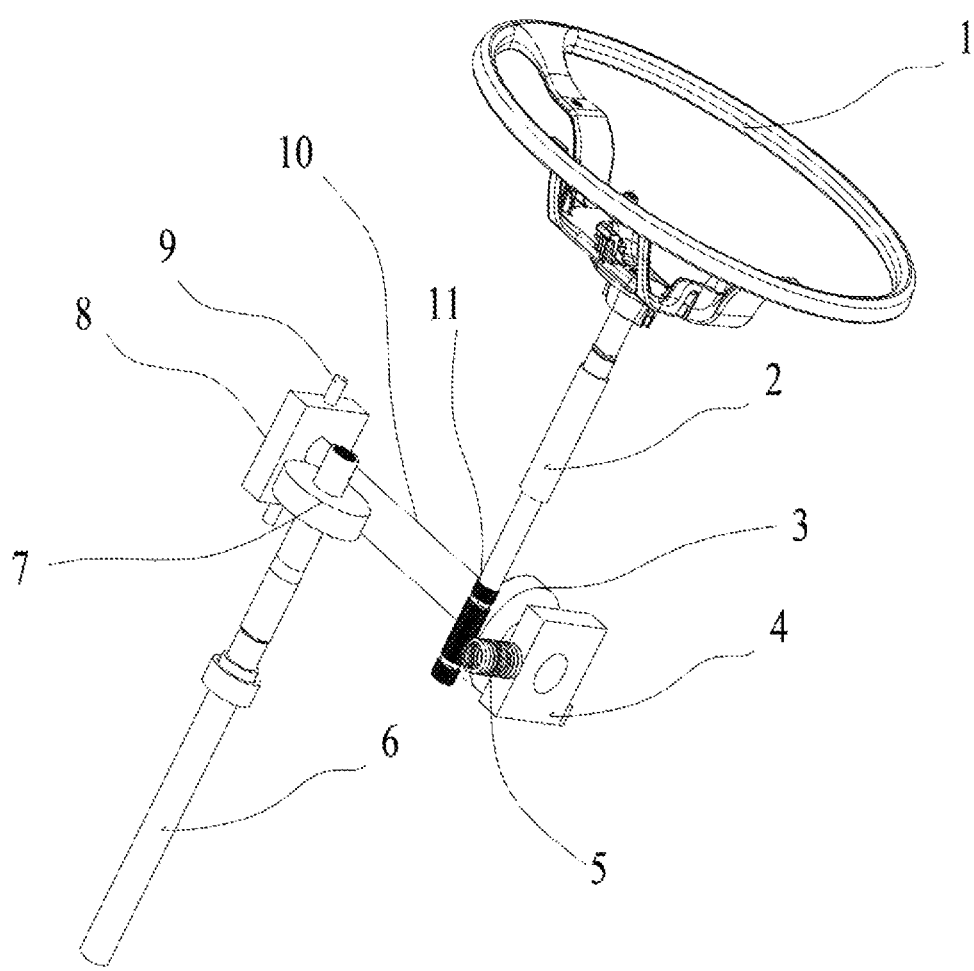
FIG. 1 is a first schematic and perspective view of the detachable steering mechanism of the invention.
Figure 2:
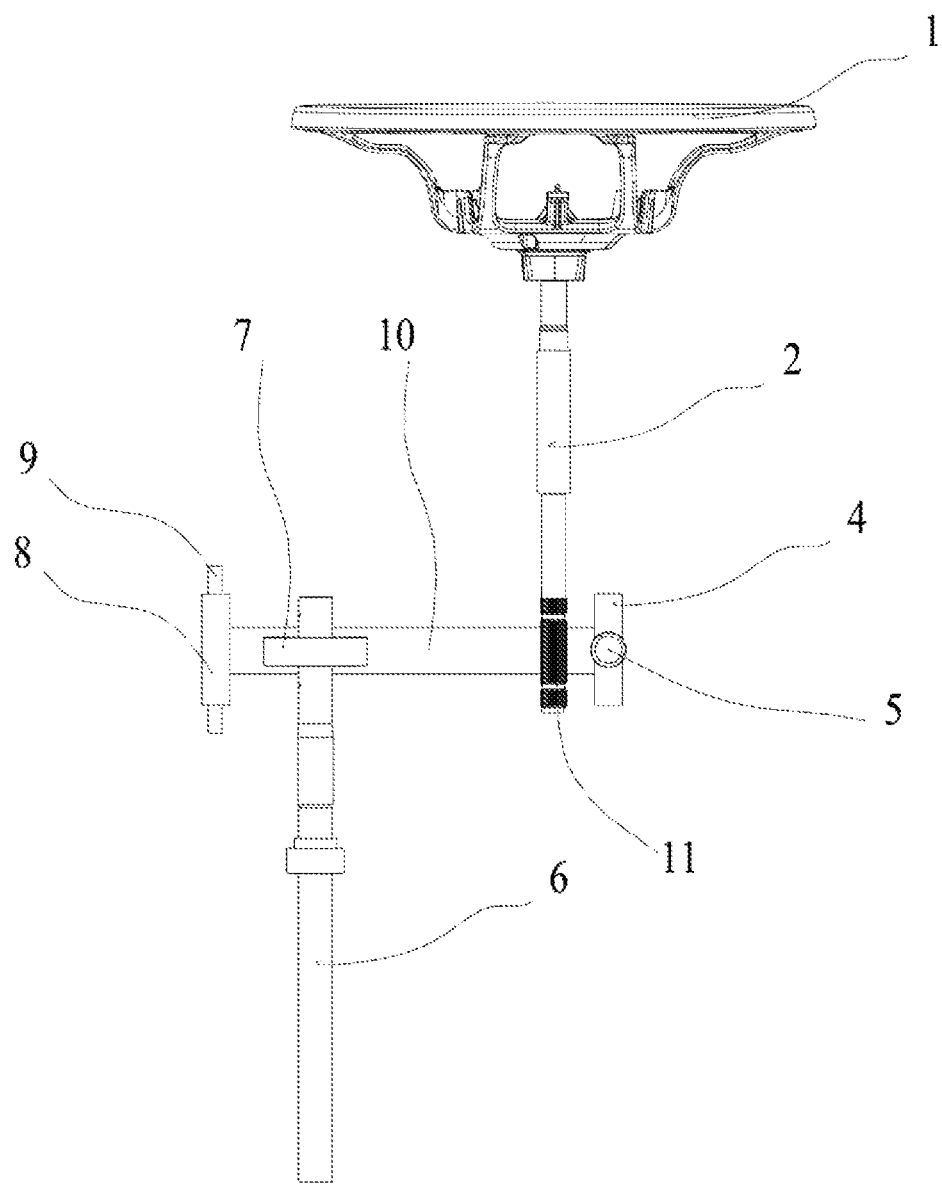
FIG. 2 is a second schematic and perspective view of the detachable steering mechanism of the invention.

As shown in FIG. 1 and FIG. 2, the detachable steering mechanism of the embodiment of the present invention, comprises a steering wheel 1, an upper steering column 2, a worm 10, a lower steering column 6, a first drive gear 3, a second driving gear 7, a drive system and a control system; the steering wheel 1 is arranged at the upper end of the upper steering column 2, the upper steering column 2 is provided with a thread 11 near its lower end. One end of the worm 10 is provided with a first bearing seat 4, and the other end of the worm 10 is provided with a second bearing seat 8. The first bearing seat 4 and the second bearing seat 8 are fixedly mounted in a manner that they can move in some particular situation, for example, being mounted to the body of the vehicle, or a member fixed to the body. The worm 10 is provided with a first drive gear 3, and the central axis of the first drive gear 3 is coincident with the central axis of the worm 10. The lower steering column 6 is provided with a second drive gear 7, and the central axis of the second drive gear 7 is perpendicular to, and does not intersect with, that of the worm 10. The steering wheel 1 is fixed and connected to the upper steering column 2. When the steering wheel 1 is rotated, the steering wheel I can drive the upper steering column 2 to rotate. The thread 11 on the upper steering column 2 engages with the first drive gear 3, and the upper steering column 2 can drive the worm 10 to rotate. The thread of the worm 10 engages with the second drive gear 7, and drives the lower steering column 6 to rotate. When the steering wheel airbag is ejected, the control system can detects the ejection of the airbag, and then controls the drive system to drive the worm 10, so that the worm 10 is moved. So that the first drive gear 3 disengages from the thread 11 of the upper steering column 2. Thus, when the airbag in the steering wheel is ejected, the steering wheel and the upper steering column 2 can move along axis of the upper steering column 2. In a collision, the driver's head impacts on or into the airbag above the steering wheel. Because the steering wheel can move axially, the collision between the airbag and the driver's head may be buffed in a longer buffer travel, and the impact of the airbag on the driver's head is reduced, and the safety performance of the airbag is improved.

Figure 5:
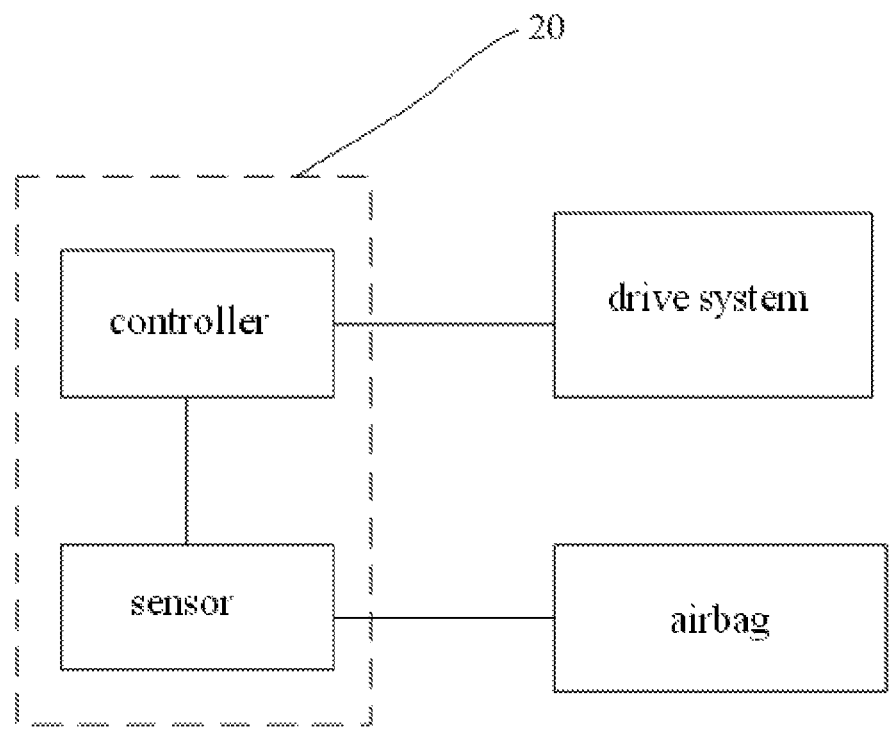
FIG. 5 is a block diagram of the control system of the present invention.

In particular, the control system 20 comprises a sensor and a controller. The controller is connected with the sensor and the drive system respectively, as shown in FIG. 5. The controller can be made of a single-chip, and the sensor monitors whether the airbag of the steering wheel is ejected or not. Preferably, the sensor of the embodiment is a trigger-type sensor. The trigger-type sensor sends an airbag-triggered signal to the controller, the controller processes this signal and then sends an instruction to the drive system, and then the drive system drives the worm, so that the drive gear on the worm disengages from the threads of the upper steering column.

The drive system of the invention may has any suitable structure, as long as it can drive the worm so that the first drive gear on the worm disengages from the threads of the steering column. That is to say, the first and second bearing seats 4, 8 are mounted to the main body of the vehicle in a manner that they can translate or rotate relative to the main body.

Figure 3:
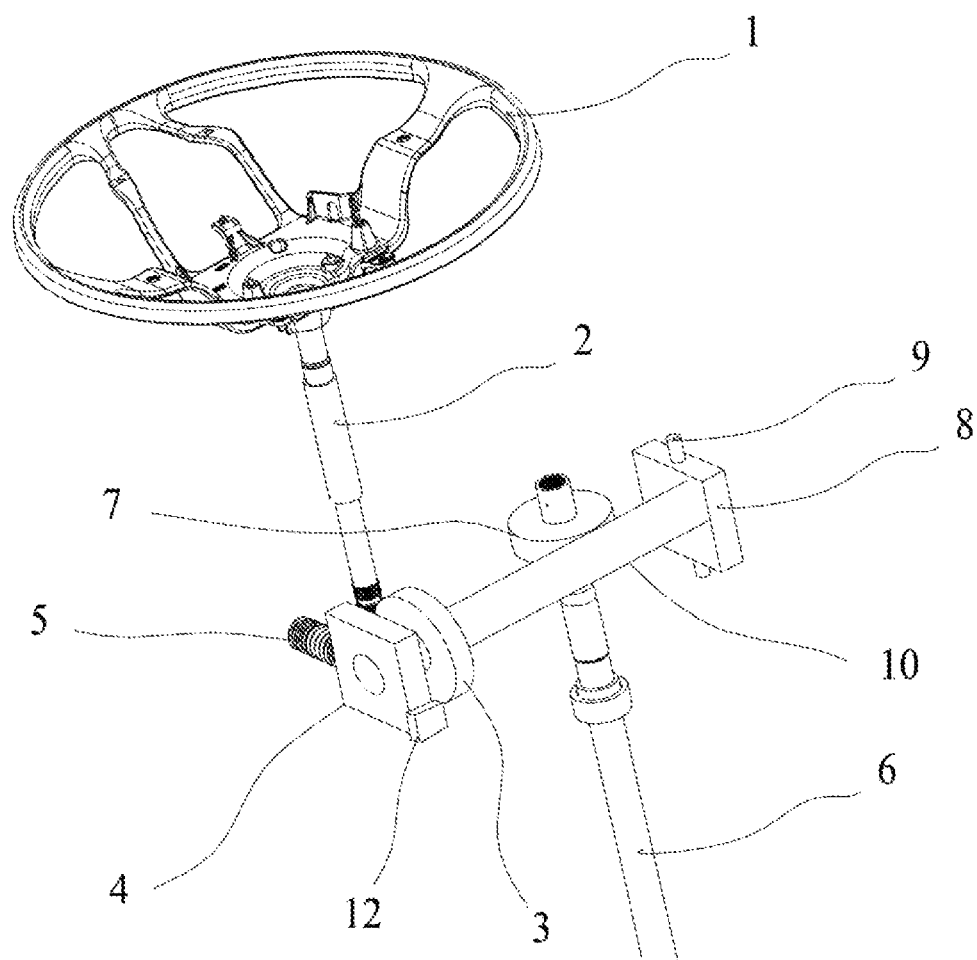
FIG. 3 is a third schematic and perspective view of the detachable steering mechanism of the invention.
Figure 4:
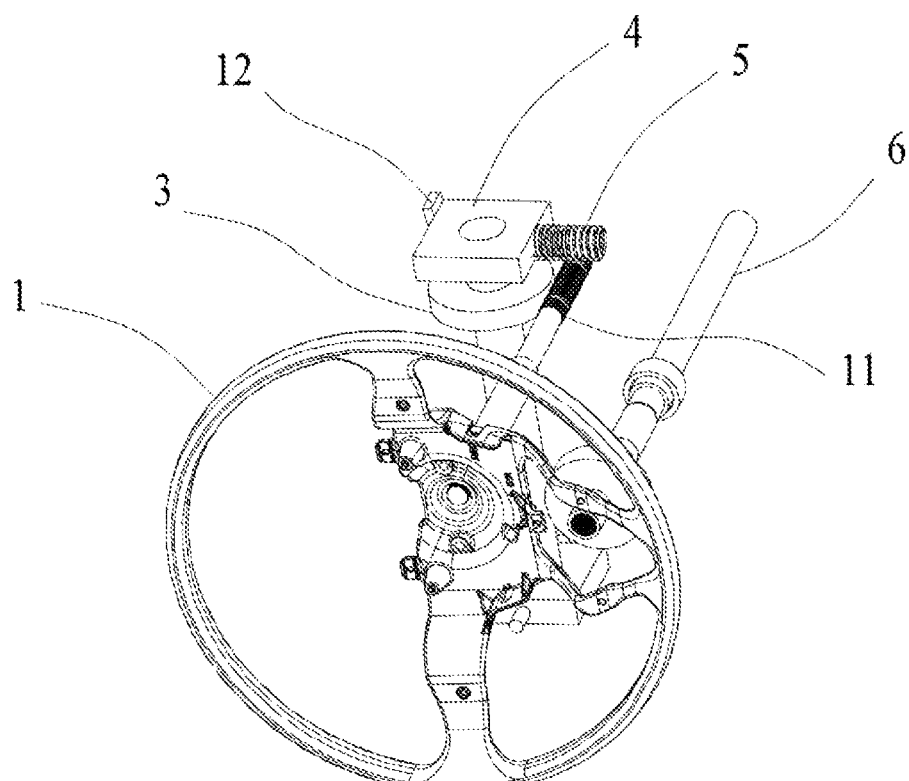
FIG. 4 is a fourth schematic and perspective view of the detachable steering mechanism of the invention.

As shown in FIGS. 3 and 4, the drive system preferably comprises an elastic member in a pre-loaded state; and a block driving mechanism (not shown). The elastic member comprises preferably a spring or springs 5, which have one end arranged on or abutted against the side surface of the first bearing seat 4.

It is understood that the other end of the spring 5 abuts against the main body of the vehicle or a component or structure fixed to the main body. The spring 5 exerts an elastic force perpendicular to the side surface of the first bearing seat 4, such that the first bearing seat 4 has a tendency to deviate from its normal position. A block 12 is arranged at one side of the first bearing seat 4, opposite to the spring 5. The block 12 is used for blocking the first bearing seat 4 to be moved by the force of the spring 5. The block driving mechanism is powered electrically or pneumatically, i.e., in a pneumatic mode or an electrical mode.

The pneumatic mode means that a pneumatic power is used for driving a mechanical transmission mechanism to execute an extending and/or withdrawing movement, so that the block 12 moves away from the first bearing seat 4. Similarly, the electrical mode means that an electrical motor is used for driving the mechanical transmission mechanism to execute an extending and/or withdrawing movement, and to drive the block.

When the steering wheel airbag is ejected or deploys, the block 12 is driven by the block driving mechanism to move away from the first bearing seat 4. The spring 5 forces the first bearing seat 4 to move and to drive the worm 10, so that the first drive gear 3 of the worm 10 disengages from the thread 11 of the steering column 2.

Further, the number of the springs 5 is more than one. The spring 5 is vertically arranged on the side surface of the first bearing seat 4, which is close to the upper steering column 2, and the spring 5 is under compression. One end of the spring 5 is connected with the first bearing seat, and the other end is connected with a bracket which is fixed to the body of the automobile body. The springs 5 are evenly distributed on one side surface of the first bearing seat 4, to ensure that the first bearing seat is uniformly stressed.

The second bearing seat 8 is provided with a pin 9 therein, and the worm 10 can drive the second bearing seat 8 to rotate around the pin 9 and to disengage from the upper steering column 2. The pin 9 is arranged in a direction parallel to the upper steering column 2 and is arranged in the second bearing seat 8, and is fixed on the vehicle body bracket. When the spring 5 pushes the worm 10 away from the upper steering column 2, the worm 10 drives the second bearing seat 4 to rotate around the pin 9, so that the first drive gear 3 of the worm 10 disengages from the thread 11 of the upper steering column 2.

In the embodiment of the shown embodiment, the first bearing seat 4 and the second bearing seat 8 each is rotated around the pin 9. In a not-illustrated embodiment, the first bearing seat and the second bearing seat is translated synchronously, in order to drive the first drive gear to move away from or disengage from the thread of the upper steering column. Concretely, the first bearing seat is provided with a driving mechanism, and the second bearing seat is also provided with the elastic member. A block is provided for the second bearing seat, so as to block the second bearing seat from being moved by the thrust force of the elastic member. When the steering wheel airbag deploys, the block driving mechanism drives the block to moving and to disengage from the second bearing seat, and the thrust force from the elastic member drives the second bearing seat, so as to drive the worm. Thus, by means of synchronous translation of the first bearing seat and the second bearing seat, the worm is driven, and the first drive gear on the worm disengages from the thread of the upper steering column.

The embodiments are used only for illustrating the invention, rather than limiting the invention. Those skilled in the art can make various changes and variations according to the spirit of the invention and in the scope of the invention.

Therefore, the equivalent technical solutions are in the scope of the invention, and the scope of the invention shall be defined by the claims.

The invention claimed is:

1. A detachable steering mechanism, comprising a steering wheel, an upper steering column, a worm, a drive system and a control system; the worm includes a first end provided with a first bearing seat, and a second end provided with a second bearing seat; the steering wheel is fixedly connected to the upper steering column; the upper steering column is provided with a thread, and the worm is provided with a first drive gear, the thread of the upper steering column engages with the first drive gear; if the control system detects the deploying of the steering wheel airbag, it controls the drive system to drive the worm, so that the first drive gear disengages from the thread of the upper steering column, in order to allow the upper steering column to move along its own axis.

2. A detachable steering mechanism of claim 1, wherein, the control system comprises a sensor and a controller, the controller is connected with the sensor and the drive system, respectively.

3. A detachable steering mechanism of claim wherein, the sensor is a trigger-type sensor.

4. A detachable steering mechanism of claim 1, wherein, the drive system comprises a block driving mechanism and an elastic member in a pre-loaded state; the elastic member is arranged on the first bearing seat; the first bearing seat is provided with a block, to block the movement of the first bearing seat due to thrust action by the elastic member; when the steering wheel airbag is ejected, the block driving mechanism drives the block to move away from the first bearing seat, and the elastic member forces the first bearing seat to drive the worm.

5. A detachable steering mechanism of claim 4, wherein, the distance between the first bearing seat and the first drive gear is smaller than the distance between the second bearing seat and the first drive gear.

6. A detachable steering mechanism of claim 4, wherein, the spring is vertically arranged on the side of the first bearing seat close to the side of the upper steering column, and the spring is in a compression state.

7. A detachable steering mechanism of claim 4, wherein, the second bearing seat is provided with a pin; under the thrust force of the elastic member, the worm drives the second bearing seat to rotate around the pin.

8. A detachable steering mechanism of claim 7, wherein, the pin is arranged in the second bearing seat, in the direction parallel to the upper steering column.

9. A detachable steering mechanism of claim 4, wherein, the elastic member in the pre-loaded state is arranged on the second bearing seat; a block is provided for the second bearing seat, used for blocking the second bearing seat to move under the thrust force of the elastic member; when the steering wheel airbag is ejected, the block driving mechanism drives the block to move away from the second bearing seat, and the elastic member forces the second bearing seat to drive the worm.

10. A detachable steering mechanism of claim 4, wherein, the block driving mechanism is powered electrically or pneumatically.

* * * * *